UNITED STATES PATENT OFFICE.

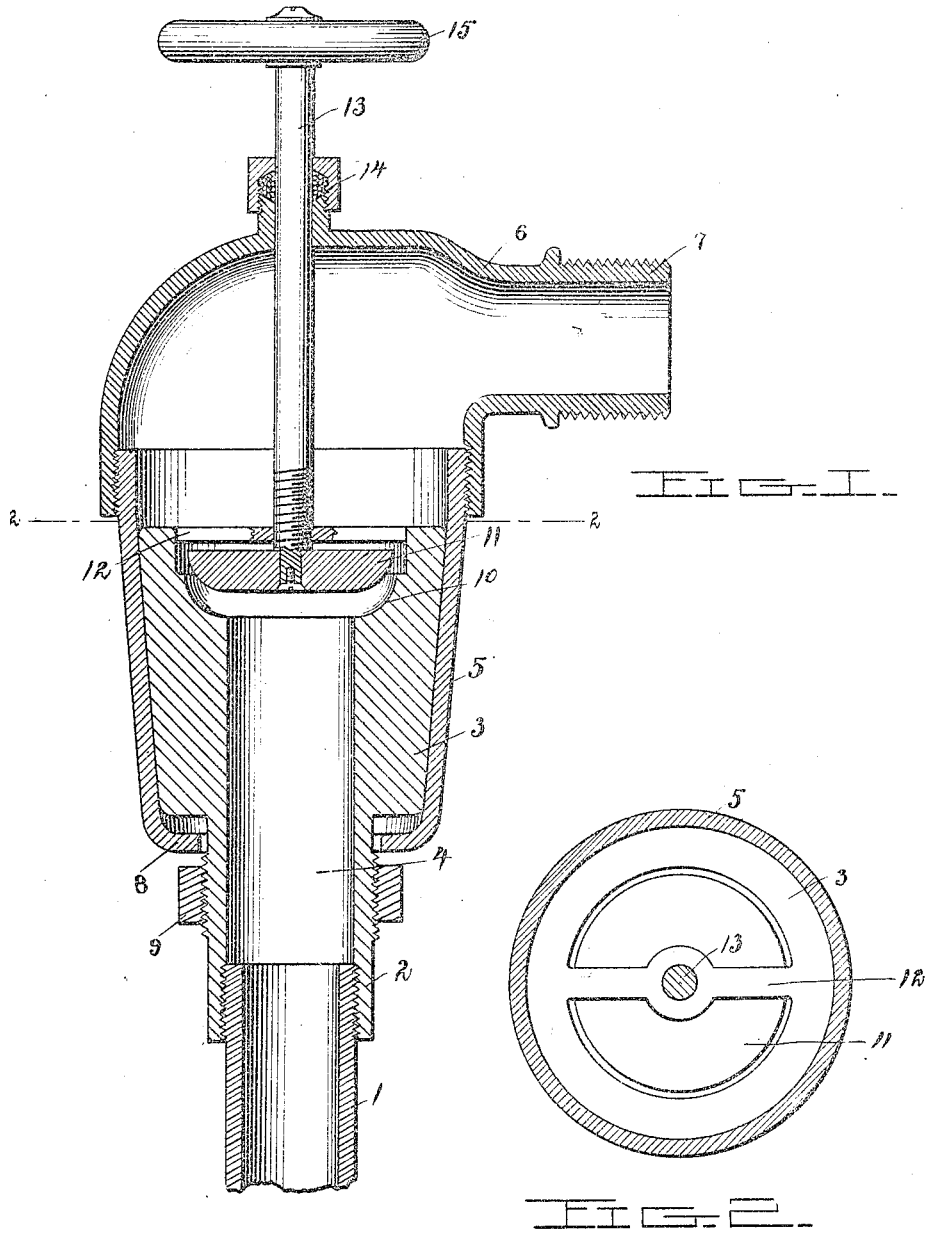

GEORGE S. LIVENGOOD, OF WALLA WALLA, WASHINGTON.

HOSE-BIB.

1,052,352.  Specification of Letters Patent.  Patented Feb. 4, 1913.

Application filed September 12, 1911. Serial No. 648,878.

*To all whom it may concern:*

Be it known that I, GEORGE S. LIVENGOOD, a citizen of the United States, residing at Walla Walla, in the county of Walla Walla and State of Washington, have invented new and useful Improvements in Hose-Bibs, of which the following is a specification.

This invention relates to hose bibs and the object of the invention is to provide a device of this character which will permit the nose to be dragged around from place to place without putting kinks in the hose and thus choking the supply of water and which will prevent the hose from breaking or bursting at these points.

A further object of the invention is the provision of a valve of this type having a casing swiveled on the head of the valve in such a manner that the pressure of the water will always maintain a tight joint between the head and the casing when the water is turned on and which will permit the casing to swing entirely around the head, so that kinks or bad bends in the hose are avoided.

Further objects of the invention will appear as the following specific description is read in connection with the accompanying drawing, which forms a part of this application, and in which:—

Figure 1 is a vertical sectional view of the device. Fig. 2 is a horizontal section taken on the line 2—2 of Fig. 1.

Referring more particularly to the drawing, 1 represents an ordinary supply pipe which is exteriorly threaded at its upper end to receive the projecting pipe end 2 of the valve head 3. This valve head is provided with a central passage 4 which communicates with the passage through the pipe section 2 and is tapered upon its outer side so as to be received within the tapered casing section 5. This casing section has secured thereto, upon its upper end, an L 6 having a reduced threaded extension 7 upon which the hose coupling is adapted to be connected. The lower end of the casing section 5 is provided with an annular inturned flange 8 which extends beneath the bottom of the end 5 and lies in the path of an adjusting nut 9 threaded upon the pipe extension 2. By the use of this adjusting nut the friction between the head and the casing section 5 may be properly regulated, so as to secure a tight joint between the parts and thereby prevent leakage.

The upper end of the channel 4 is outwardly flared so as to form a seat 10 for the valve disk 11 which is arranged between the seat and the bridge piece 12 extending across the upper end of the head and channel 4. Threaded into this bridge piece and swiveled to the valve disk is a valve stem 13 which extends through the packing gland 14 on the casing section 6 and is provided on its upper end with a manipulating device 15 in the form of a wheel.

When the valve is raised from its seat and water is flowing through the channel 4 against the upper inner portion of the casing section 6 the entire casing will be raised so as to bring the casing section 5 into tight engagement with the head 3 and thus prevent leakage at this point. As long as the water is turned on the joint between the head and the casing is held tight but, at the same time, permits the rotation of the casing upon the head, so that the hose may be pulled from point to point around the supply pipe without putting kinks in the same or bending it at the point of connection with the casing.

Having thus described the invention, what I claim as new is:—

In a device of the class described, the combination with a fluid supply pipe, a centrally channeled head secured thereto and having a conical outer surface, a casing section fitting upon said head, means carried by the head for adjusting the casing section to increase or decrease the friction between the casing and head, a second casing section secured to the first section and having a hose nipple thereon, a valve stem passing through said second casing section and threaded into the head, and a valve disk swiveled on to the end of the valve stem and adapted to close the channel through the head.

In testimony whereof I affix my signature in presence of two witnesses.

GEORGE S. LIVENGOOD.

Witnesses:
 ALLEN H. REYNOLDS,
 ALBERTA WORTHINGTON.